Jan. 20, 1931.  B. McGOVERN  1,789,471
MACHINE FOR FORMING HOLLOW GLASS ARTICLES
Filed June 4, 1928
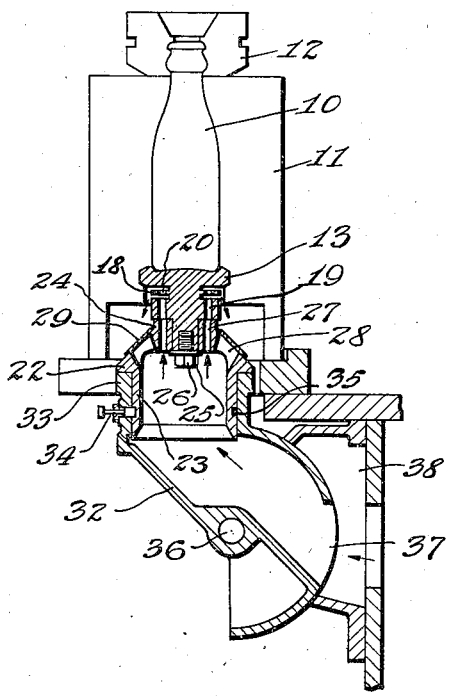
FIG-1-
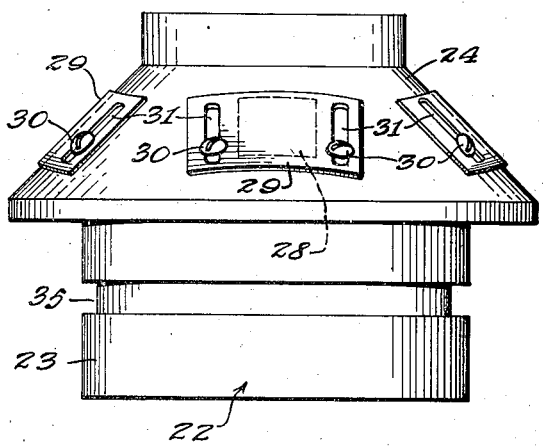
FIG-2-
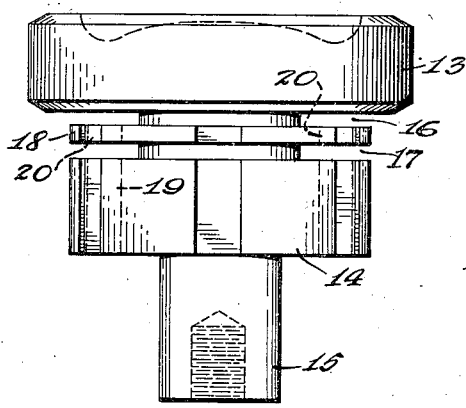
FIG-3-
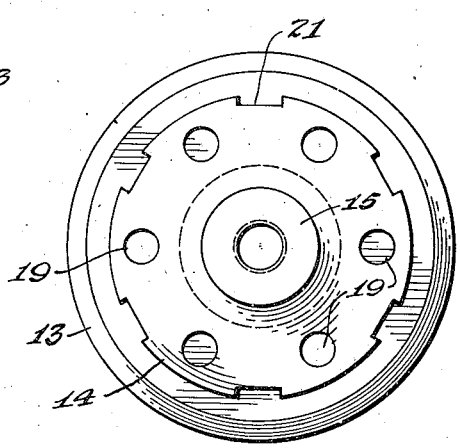
FIG-4-
Inventor
Byrne McGovern
By J. F. Rule,
Attorney Patented Jan. 20, 1931

1,789,471

UNITED STATES PATENT OFFICE

BYRNE McGOVERN, OF EVANSVILLE, INDIANA, ASSIGNOR TO OWENS-ILLINOIS GLASS COMPANY, OF TOLEDO, OHIO, A CORPORATION OF OHIO

MACHINE FOR FORMING HOLLOW GLASS ARTICLES

Application filed June 4, 1928. Serial No. 282,684.

My invention relates to machines for molding glass articles and, more particularly, to the construction of the mold bottoms and air cooling means associated therewith.

An object of the invention is to provide an improved form of mold bottom and air cooling means for effectively cooling the same, together with adjustable means for directing, regulating and controlling the circulation of the cooling air.

Other objects of the invention will appear hereinafter.

In the accompanying drawings:

Fig. 1 is a sectional elevational view showing a construction embodying the principles of my invention.

Fig. 2 is a side elevation on a larger scale, showing a mold bottom support.

Fig. 3 is an elevation of the mold bottom plate.

Fig. 4 is a bottom plan view of the mold bottom plate.

The present invention, as herein shown, is designed for use on a machine of the type shown, for example, in the patent to Albert N. Cramer, Number 1,693,069, granted November 27, 1928, on application Serial Number 78,581, although it will be understood that the invention may be used with other types of machines.

Referring to the drawings, the bottle 10 or other glass article is blown to its finished form in the finishing mold 11 which comprises, as usual, two horizontally separable sections. The parison of glass is given its preliminary shape in the blank mold and while supported in the neck mold 12 is transferred to the finishing mold in the usual manner before being blown to its final shape.

A mold bottom plate 13 engages the lower end of the parison suspended from the neck mold before the finishing mold 11 closes around the parison. The bottom plate 13 is formed with a cylindrical downward extension 14, said extension in turn having an integral stem 15 projecting downward therefrom. Annular recesses or grooves 16 and 17 are provided in the extension 14 separated by a narrow section or flange portion 18. An annular series of circular openings 19 is formed in the extension 14, openings 20 also being provided in the flange portion 18 in alignment with the openings 19. The exterior surface of the extension 14 is provided with an annular series of recesses 21 formed in the vertical walls thereof.

The bottom plate 13 is mounted in a plate holder 22 which comprises a hollow cylindrical body portion 23 and a crown or top portion 24, the outer walls of which are upwardly and inwardly inclined. The stem 15 of the mold bottom extends downward through a correspondingly shaped opening formed in the crown 24. The mold bottom is removably secured in position in the plate holder by means of a washer 25 and screw bolt 26. An annular series of vertical openings 27 is formed in the crown 24 in alignment with the openings 19, thereby providing passageways for cooling air which is transmitted through the plate holder 22.

Passageways 28 extend in an upward and outward direction through the crown 24 and terminate in openings exterior to the bottom plate extension 14. The size of these openings may be adjusted or restricted to any desired extent or the passageways may be entirely closed by means of adjustable cover plates 29 shaped to fit over these openings and adjustably secured to the plate holder by set screws 30 which extend through slots 31 formed in the cover plates.

The plate holder 22 is removably mounted in a hollow carrier 32 which is formed with a cylindrical extension 33 to receive the plate holder. The latter is removably held in the carrier by means of a spring actuated detent 34 mounted on the carrier and engaging an annular groove 35 formed in the outer wall of the plate holder 22. The detent 34 may readily be withdrawn by hand to release the plate holder and permit it, together with the bottom plate 13, to be removed from the carrier 32.

The carrier is mounted on a horizontal shaft 36 and is arranged to swing about the axis of said shaft for tilting the mold bottom to discharge the bottle, as fully set forth in the patent to Cramer, above identified.

The carrier 32 is provided with an opening 37 in communication with an air chamber 38 from which cooling air is supplied to the carrier. The air passes upward through the plate holder 22 and through the aligned openings 27 and 19 to the annular recess 17. A portion of the air also passes through the openings 20 to the recess 16 and impinges against the bottom surface of the plate 13. It will be seen that the air is thus caused to circulate in contact with the lower surface of the bottom plate 13, the upper and lower surfaces of the flange 18 and the upper surface of the extension 14 below the recess 17. This, together with the circulation of the air through the interior of the bottom plate as the air passes through the openings 27 and 19, provides an effective means for extracting heat from the bottom plate. If additional cooling is desired, the cover plates 29 may be adjusted to open the passageways 28 to a greater or less extent, allowing the air to move upward through said passageways and against the exterior surfaces of the bottom plate. It will be observed that the air passages through the mold bottom plate are so arranged that the cooling air as it emerges from the bottom plate is deflected outwardly so that while the finishing mold is open and a bare parison suspended above the bottom plate, there is no direct draft of air against the parison. Undesirable cooling of the parison is thus prevented.

Modifications may be resorted to within the spirit and scope of my invention.

What I claim is:

1. A horizontally disposed mold bottom plate having a depending cylindrical extension of reduced diameter, said extension having openings extending upwardly therethrough, said plate with its extension being formed with spaced circumferential grooves or recesses extending inwardly from its peripheral surface and intercepting said openings.

2. A mold bottom plate formed with passageways extending upwardly therethrough for the passage of cooling air and opening laterally to the exterior of the bottom plate at a position or positions below the upper surface of said plate, a hollow plate holder on which said plate is mounted, said plate holder being provided with passageways extending through the wall thereof some of which are in register with said first mentioned passageways and others of which are arranged to direct cooling air against the exterior surfaces of the bottom plate, and means for supplying cooling air to the interior of said plate holder and through said passageways.

3. A mold bottom plate formed with passageways extending upwardly therethrough for the passage of cooling air and opening laterally to the exterior of the bottom plate at a position or positions below the upper surface of said plate, and a hollow plate holder on which said plate is mounted, said plate holder being provided with passageways for the passage of cooling air through the upper wall of the plate holder, some of said last mentioned passageways being in register with said first mentioned passageways and others arranged to open exteriorly of the bottom plate.

4. A mold bottom plate formed with passageways extending upwardly therethrough for the passage of cooling air and opening laterally to the exterior of the bottom plate at a position or positions below the upper surface of said plate, a hollow plate holder on which said plate is mounted, said plate holder being provided with passageways for the passage of cooling air through the upper wall of the plate holder, some of said last mentioned passageways being in register with said first mentioned passageways and others arranged to open exteriorly of the bottom plate, and adjustable cover plates for the passageways which open exteriorly of the bottom plate for adjustably restricting and regulating the supply of air therethrough.

5. The combination of a mold bottom plate, and a hollow plate holder on which said plate is removably mounted, said plate holder being provided with openings through the walls thereof, said openings surrounding the bottom plate and arranged to direct cooling air supplied through said plate holder against the exterior walls of the bottom plate.

6. The combination of a mold bottom plate, and a hollow plate holder on which said plate is removably mounted, said plate holder being provided with openings through the walls thereof arranged to direct cooling air supplied through said plate holder against the exterior walls of the bottom plate, said bottom plate being provided with air passageways extending therethrough and in communication with the interior of the plate holder.

Signed at Evansville, in the county of Vanderburg and State of Indiana, this 28 day of May, 1928.

BYRNE McGOVERN.